United States Patent

MacMullan

[15] 3,697,871

[45] Oct. 10, 1972

[54] SINGLE ELEMENT ADJUSTMENT FOR SPAN AND GAIN

[72] Inventor: Samuel J. MacMullan, Newtown, Pa.

[73] Assignee: Leeds & Northrup Company, North Wales, Pa.

[22] Filed: March 19, 1970

[21] Appl. No.: 20,880

[52] U.S. Cl...................324/99 R, 318/666, 318/678, 324/100, 324/115

[51] Int. Cl...........................G01r 17/06, G01r 15/08

[58] Field of Search.........324/99, 100, 113; 318/615, 318/650, 666, 667, 678, 681; 346/31, 32

[56] References Cited

UNITED STATES PATENTS 2,790,945 4/1957 Chope.....................324/99 X

*Primary Examiner*—Rudolph V. Rolinec
*Assistant Examiner*—Ernest F. Karlsen
*Attorney*—Woodcock, Washburn, Kurtz & Mackiewicz

[57] ABSTRACT

In an adjustable span null balance system the input signal is applied to an amplifier. A first feedback voltage related to the output of the amplifier is summed with a second feedback voltage related to the output of the system. The summed voltages are applied to a single adjustable resistance connected to the input to the amplifier. A change in this adjustable resistance changes both the span of the system and the gain of the amplifier without changing the sensitivity of the system.

9 Claims, 5 Drawing Figures

PATENTED OCT 10 1972

3,697,871

SHEET 1 OF 2

SINGLE ELEMENT ADJUSTMENT FOR SPAN AND GAIN

BACKGROUND OF THE INVENTION

This invention relates to null balance systems and more particularly to a recorder having a null balance network with the span and the gain of the network adjustable with a single adjustable resistance.

Null balance systems are shown in U.S. Pat. Nos. 3,281,685 Talbot and 3,317,833 Miller. The systems shown in both of these patents include adjustable resistances for adjusting the span of the recording system. When the span is adjusted, the gain of the amplifier must be changed. In the systems shown in these patents the gain is changed by a gain control circuit ganged to the same knob which sets the span adjustment. In the system of the Miller patent there is shown a continuously adjustable span network. When continuous adjustments are made in the span, continuous adjustments must be made in the gain of the amplifier in order to maintain the system sensitivity constant. While the systems of the Miller and Talbot patents have proven quite satisfactory, they are expensive to manufacture because a large number of circuit elements are involved together with the multiple ganged switch.

SUMMARY OF THE INVENTION

In accordance with an important aspect of this invention, a simple, economical system is provided in which a single adjustable element changes both the system span and the gain of the amplifier. Because a single-ended span of the system and the gain of the amplifier are linearly related, they can be changed concurrently without changing the sensitivity of the system.

In one embodiment, the span and gain adjustment is included in a recorder of the type in which a potentiometer has an adjustable slidewire which develops a balance voltage in opposition to the input signal.

Between the output of the amplifier and the output of the system, there is a dynamic sub-system which has a time constant which is large compared to the time constant of the system. Alternatively, the dynamic sub-system may have an output response which is non-linear with respect to its input, or the sub-system may have both non-linearity and a time constant which is large compared to the time constant of the system. Because of the presence of this dynamic sub-system, the amplifier feedback is not the same as the system feedback. Therefore, changes in only one feedback path will change the sensitivity of the system. However, in accordance with the present invention, both feedback signals are changed concurrently with a single adjustable element to effect change in the span of the system without affecting the sensitivity of the system.

DESCRIPTION OF A PARTICULAR EMBODIMENT

Figure 1:
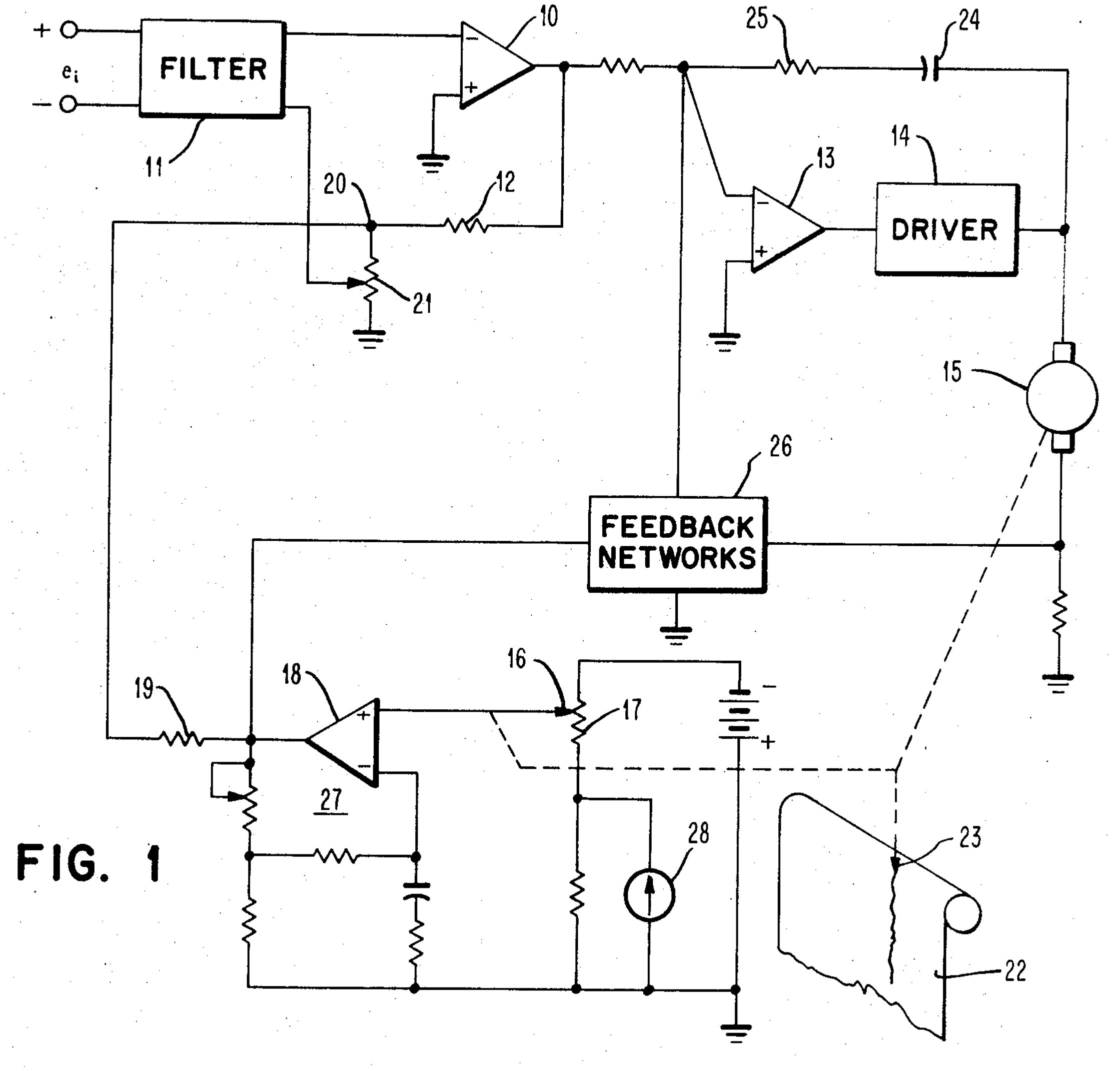
FIG. 1 shows a schematic diagram of the system.

Referring to FIG. 1 the adjustable span null balance system includes a linear amplifier 10. The input signal, in this case a voltage, is applied through filter 11 to the amplifier 10.

A feedback voltage component, at summing point 20, related to the output of the amplifier, is produced by the current that flows through resistor 12. A feedback voltage related to the output of the system is produced by the second amplification stage 13, the servo driver 14, and the servo motor 15 which positions the adjustable slidewire 16 on the potentiometer 17. The voltage on the slidewire 16 is the system feedback voltage which is operated upon by amplifier circuit 27. The output of amplifier circuit 27, which includes amplifier 18, is applied to resistance 19 in order to produce a voltage component at the summing point 20 which is summed with the first feedback voltage.

A single adjustable resistance 21 is connected to the input of amplifier 10. In this case the adjustable resistance is a potentiometer which is connected to the input of amplifier 10 which is at reference ground potential. The amplifier 10 can be either a differential amplifier of a single-ended amplifier referenced to ground. Where a differential amplifier is used, one input is connected to ground as shown.

As shown in FIG. 1 the null balance system is part of a recorder system. The recorder includes the usual strip-chart 22 and a pen 23 which is positioned on the strip-chart in accordance with the input voltage. Of course it will be understood that the system is applicable to other types of recorders, such as an XY recorder, or a round-chart recorder. Alternatively, the system is applicable for use in an indicator. The system is also applicable to types of null balance systems other than recorders and indicators.

The servo motor 15 concurrently positions the pen 23 as it positions the slidewire 16 to a position at which the feedback voltage on the adjustable contact 16 balances the input voltage.

In the recorder system shown in FIG. 1 the dynamic sub-system including the amplifier 13, the driver 14, and the servo motor 15 causes discrepancy between amplifier output and system output. For example, the feedback network including the capacitor 24 and the resistor 25 is used to cancel out the mechanical time constant of the servo motor 15 and replace it with a sub-system time constant which is quite large compared to the overall effective time constant of the system. The sub-system causes another type of discrepancy between amplifier output and system output. This is due to an output response which is non-linear with respect to the input. That is, a given change in input may produce differing changes in output depending upon the operating point. For example, the motor velocity or acceleration may be constrained.

Either of these discrepancies make it impractical to change the span without changing sensitivity of the system by merely changing system feedback or alternatively by changing the feedback of the amplifier 10. As used here sensitivity means the unique correspondence between an input state trajectory and an output state trajectory. The circuit between the dynamic sub-system output and the dynamic sub-system input has a sensitivity. This sensitivity is independent of the dynamic sub-system. In accordance with the present invention, the span can be changed without changing this sensitivity by simultaneously changing both feedbacks. It will be appreciated that this invention has applicability to other systems having sub-systems in which either or both of the aforementioned discrepancies, as well as other discrepancies, are present.

The recorder system shown in FIG. 1 includes non-linear feedback networks indicated at 26. These feedback networks are the subject matter of patent application Ser. No. 20,885, filed Mar. 19, 1970, to the present inventor and Albert J. Williams, Jr. and filed concurrently herewith.

The recorder system shown in FIG. 1 also includes amplifier circuit 27 having a feedback loop for amplifier 18. Amplifier 18, together with its feedback loop, acts as a proportional plus derivative circuit. The recorder includes the variable current source 28 for establishing the zero point of the system.

Figure 2:
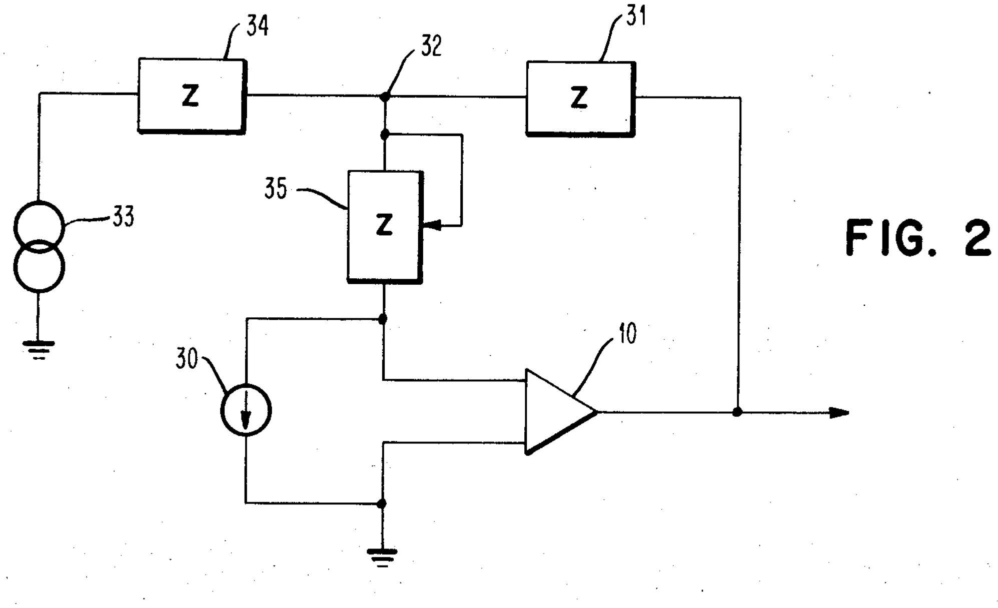
FIG. 2 shows a modification of the system wherein the input signal is a current.

In FIG. 2 the unknown input signal is a current source 30 connected to the input of amplifier 10. The first feedback signal, shown to be a voltage in this case, is applied through impedance 31 to the summing point 32. This feedback voltage component is related to the output of the amplifier 10. In this case it is proportional to the output of amplifier 10 if impedance 31 and impedance 35 are resistive.

The second feedback signal related to the output of the system is shown as the voltage source 33. This voltage is applied through impedance 34 to the summing point 32.

The adjustable resistance element is a rheostat 35 connected between the summing point 32 and an input of the amplifier. Adjustment of the rheostat 35 changes both the span of the system and the gain of the amplifier without changing the sensitivity of the system.

Figure 3:
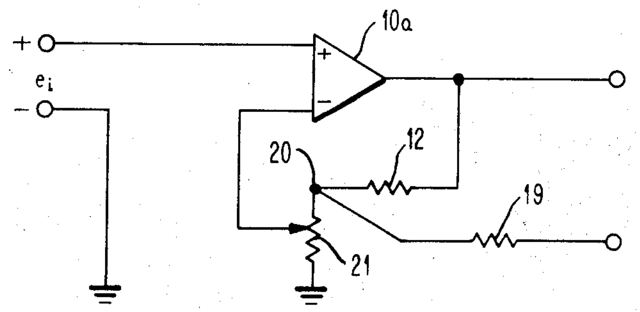
FIG. 3 shows a modification of FIG. 1 where the amplifier is a differential amplifier.

FIG. 3 shows a modification of the circuit of FIG. 1 wherein the amplifier 10a is a differential amplifier. The system feedback is applied through resistor 19 to the summing point 20 and the amplifier feedback is applied through resistor 12 to the summing point 20 as in the previous embodiment. In this case, the adjustable resistance is a potentiometer 21 having its slidewire connected to one input of the differential amplifier **10*a*. The input voltage is connected between the other input of amplifier 10*a* and reference potential. The potentiometer 21 is connected between the summing point 20 and reference potential. Again, adjustment of the slidewire on the potentiometer 21** changes both the span of the system and the gain of the amplifier without changing the sensitivity of the system.

Figure 4:
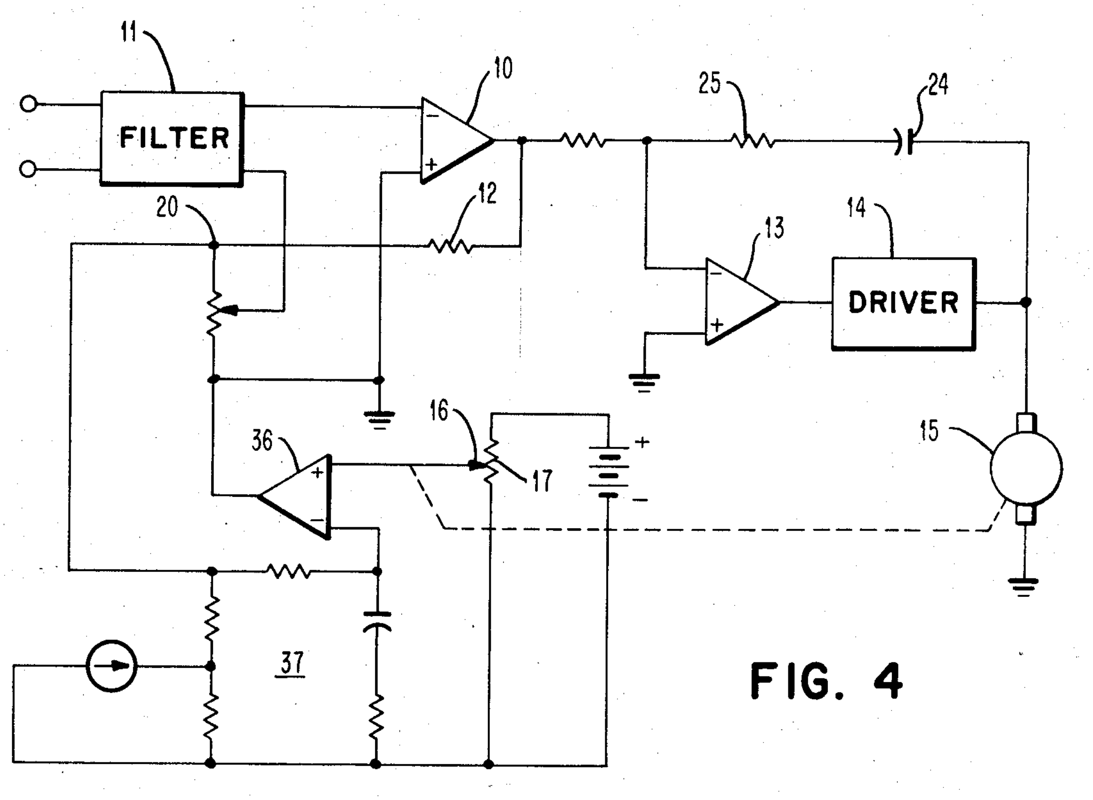
FIG. 4 shows a modification of the invention wherein the system feedback is a current.

The modification in FIG. 4 has a controlled current source as the system feedback signal. In this case, the slidewire 16 on the potentiometer 17 is connected to one input of the operational amplifier 36. The output of the amplifier 36 is connected to reference potential. The other input of amplifier 36 is connected to the feedback network 37. The feedback network 37 is connected to the summing point 20. The amplifier 36 together with its feedback network 37 is a voltage-to-current transducer, that is, a controlled current source. The amplifier 36 together with its feedback network 37 functions as a proportional plus derivative circuit as in FIG. 1.

Figure 5:
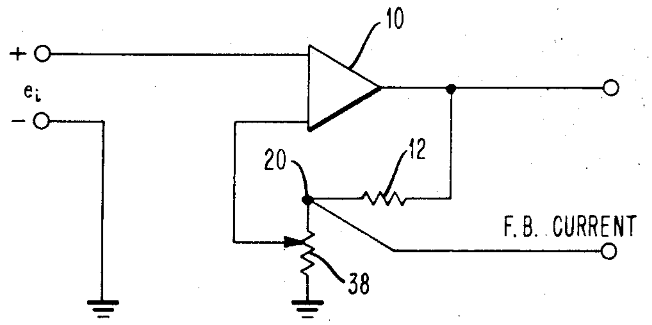
FIG. 5 shows a modification of FIG. 4 wherein the amplifier is a differential amplifier.

In FIG. 5 there is shown a modification of the circuit of FIG. 4. In this case the system feedback current is applied to the summing point 20 as in FIG. 4. Also, the amplifier feedback is applied through resistance 12 to the summing point 20. However, in this case the adjustable resistance is a potentiometer 38 connected between the summing point 20 and one input of the amplifier **10*a*. In this case the input voltage is connected between the other input of amplifier 10*a*** and reference potential.

The following theory of operation of the circuit of FIG. 1 is given to show that both the span and the gain of the system are related to the setting of the potentiometer 21 but the sensitivity of the system is not affected by the setting of the potentiometer 21.

Span and gain are determined by the adjustable voltage divider 21. Let p represent the position of the movable contact on 21, where $p$ is equal to the fraction of the resistance $R_{21}$ between the movable contact and the circuit common. If negligible current flows in the loop including the movable contact, the input voltage $e_i$, the input to amplifier 10, and the portion of $R_{21}$ between the movable contact and common, and if amplifier 10 continuously drives its input to a null (with the negligible offset voltage) with negative feedback, then the voltage at the movable contact must be equal in magnitude to the output voltage of the input filter 11. Since the output voltage of the input filter is substantially equal to the input voltage, $e_i$, at low frequencies, the voltage at the movable contact on 21 will be substantially equal in magnitude to $e_i$. Now, if the output voltage of amplifier 10 is equal to $V_{sw}$ when the pen 23 is resting at 100 percent of scale, the span, $S$, is given by the following equation:

$$S=(pR_{21}R_{12}V_{sw})/(R_{19}R_{21}+R_{12}R_{21}+R_{19}R_{12}) \qquad (1)$$

This relationship is equally applicable where $R_{12}$ and $R_{19}$ are impedances. Since span varies in direct proportion to $p$, a dial on the potentiometer 21, $R_{21}$, can be calibrated linearly in units of span.

Define preamplifier gain, $K_{A1}$, to be the change in the preamplifier output voltage, $e_{10}$, that occurs with a unit change in the input voltage, $e_i$, when the output voltage of amplifier 18 is constant. Then preamplifier gain is given by the following equation:

$$K_{A1}=(R_{21}R_{12}+R_{21}R_{19}+R_{19}R_{12})/(R_{19}R_{21}P) \qquad (2)$$

Since preamplifier gain varies inversely with $p$, it varies inversely with span.

Define sensitivity, Y, to be the change in the preamplifier output voltage, $e_{10}$, that occurs with a unit change in the slidewire feedback circuit output voltage, $e_{18}$, when the input voltage, $e_i$, is constant. Then sensitivity is given by the following equation:

$$Y=R_{12}/R_{19} \qquad (3)$$

Sensitivity is independent of $p$ and $R_F$. Thus span and gain can be varied without affecting sensitivity by moving the contact on potentiometer 21 (changing p), or by placing resistances of different values in parallel with $R_{21}$ (changing $R_{21}$). Span will vary in direct proportion to p regardless of the resistance placed in parallel with $R_{21}$, since negligible current is drawn from the movable contact. Note that the product of span and preamplifier gain is also independent of $p$ and $R_{21}$ and is equal to the sensitivity times the output of the slidewire feedback circuit when the pen is at 100 percent of span. This product is the maximum magnitude of the preamplifier output voltage when a step change of 100 percent of span occurs in the input.

The foregoing can be summarized as follows. Sensitivity is proportional to the product of span and gain. Since span is proportional to the setting of $p$ and the gain is inversely proportional with the setting of $p$, the product of the two is constant as $p$ changes.

Various modifications will be suggested. For example, FIG. 2 shows the system feedback as being a voltage. The system feedback used in that modification may be current as in FIG. 4. Various other modifications are within the scope of this invention.

What is claimed is:

1. An adjustable span null balance system responsive to an input signal comprising:

an amplifier having an input terminal and a common terminal, means for producing a first feedback signal related to the output of said amplifier, means for producing a second feedback signal related to the output of the system, means for summing said first and second feedback signals, and a single adjustable resistance having a pair of fixed terminals and an adjustable terminal, said amplifier common terminal being connected to one of said fixed terminals, the summed feedback signals being applied to the other of said fixed terminals, and said input signal being applied between said adjustable terminal and said input terminal so that a change in said adjustable resistance changes both the span of said system and the gain of said amplifier without changing the sensitivity of the system.

2. The system recited in claim 1 wherein said second feedback signal is a balancing voltage, and wherein said means for producing a second feedback signal related to the output of the system includes a potentiometer having an adjustable slidewire for developing said balancing voltage in opposition to said input signal and of a magnitude variable by adjustment of said slidewire, and means responsive to the output of said amplifier for adjusting the position of said slidewire.

3. The system recited in claim 2 wherein said null balance system is included in a strip-chart recorder for recording the magnitude of said input signal, said recorder including a marking means, said means responsive to the output of said amplifier being connected to drive said marking means on said strip-chart concurrent with the positioning of said slidewire.

4. The system recited in claim 1 wherein said system is a measuring system further comprising a dynamic sub-system having a time constant which is large compared to the effective time constant of said system, said sub-system being connected between the output of said amplifier and the output of said system.

5. The system recited in claim 1 wherein said system is a measuring system further comprising a dynamic sub-system having an output response which is non-linear with respect to its input, the output of said amplifier being connected to the input of said sub-system, the output of said sub-system being the output of said system.

6. The system recited in claim 1 wherein said adjustable resistance is a potentiometer having an adjustable slidewire and wherein said input signal is an input voltage, said input voltage being applied to said adjustable slidewire, said potentiometer being connected between said means for summing said first and second feedback signals and an input of said amplifier.

7. The system recited in claim 1 wherein said means for producing a second feedback signal includes an amplifier producing a feedback voltage, said feedback voltage being applied to said single adjustable resistance.

8. The system recited in claim 1 wherein said means for producing a second feedback signal includes an operational amplifier producing a feedback current output, said feedback current being supplied to said single adjustable resistance.

9. An adjustable span null balance system responsive to an input signal wherein a single element is used for simultaneous adjustment of span and gain, said system comprising:

a linear pre-amplifier having a pair of inputs and an output, said input signal being applied to said inputs with one of said inputs connected and referenced to circuit common, circuit means connected to the output of said pre-amplifier, said circuit means including an additional amplifier for producing a system output, said circuit means also including means for producing a feedback signal related to said system output, additional circuit means for combining said feedback signal and a signal related to the output of said pre-amplifier, and a single adjustable element having an adjustable terminal, said adjustable element being inserted and connected between said additional circuit means and circuit common for inserting a selected portion of said summed signal, said input signal being applied between the other of said pair of inputs and said adjustable terminal whereby said pre-amplifier is responsive to the difference between said input signal and said selected portion of said combined signal thus achieving simultaneous adjustment of said span and gain by said single adjustable element.

* * * * *